United States Patent
Whitefield et al.

(10) Patent No.: US 10,024,482 B2
(45) Date of Patent: Jul. 17, 2018

(54) BEND STIFFENER ASSEMBLY

(71) Applicants: William Whitefield, Houston, TX (US); Brandon Carringer, Houston, TX (US); Michael E. Fisher, Houston, TX (US)

(72) Inventors: William Whitefield, Houston, TX (US); Brandon Carringer, Houston, TX (US); Michael E. Fisher, Houston, TX (US)

(73) Assignee: Whitefield Plastics Corp., Houston, TX (US)

( * ) Notice: Subject to any disclaimer, the term of this patent is extended or adjusted under 35 U.S.C. 154(b) by 380 days.

(21) Appl. No.: 14/696,093

(22) Filed: Apr. 24, 2015

(65) Prior Publication Data
US 2016/0312544 A1 Oct. 27, 2016

(51) Int. Cl.
| F16L 57/02 | (2006.01) |
| F16L 57/00 | (2006.01) |
| H01B 7/04 | (2006.01) |
| F16L 11/02 | (2006.01) |
| F16L 11/127 | (2006.01) |

(52) U.S. Cl.
CPC ............ *F16L 57/02* (2013.01); *F16L 57/005* (2013.01); *H01B 7/045* (2013.01); *F16L 11/02* (2013.01); *F16L 11/127* (2013.01)

(58) Field of Classification Search
CPC ........... F16L 57/005; F16L 11/02; F16L 39/06
USPC ........ 285/115, 114, 116, 124.4, 124.3, 124.2
See application file for complete search history.

(56) References Cited

U.S. PATENT DOCUMENTS

| 1,904,615 | A | * | 4/1933 | Bristol | G01D 11/24 285/114 |
| 2,236,731 | A | * | 4/1941 | Oberly | B67D 7/40 285/115 |
| 2,800,242 | A | * | 7/1957 | Sauthoff | E03B 5/06 285/124.3 |
| 3,135,535 | A | * | 6/1964 | Shepard | F16L 5/02 285/124.2 |
| 3,162,412 | A | * | 12/1964 | McEntire | F16L 5/00 285/124.2 |
| 3,503,634 | A | * | 3/1970 | Cadiou | F16L 19/0212 285/124.3 |
| 3,590,855 | A | * | 7/1971 | Woollen | B67D 1/00 138/111 |
| 3,753,575 | A | * | 8/1973 | Tracy | F16L 23/08 285/124.4 |
| 3,757,824 | A | * | 9/1973 | Parkhurst | F16L 39/02 285/124.5 |
| 3,767,234 | A | * | 10/1973 | Weirich | F16L 37/56 285/123.2 |
| 3,948,315 | A | * | 4/1976 | Powell | F28D 7/06 285/124.2 |
| 4,226,432 | A | * | 10/1980 | Nakamizo | F16J 15/20 285/115 |

(Continued)

*Primary Examiner* — David Bochna
(74) *Attorney, Agent, or Firm* — Conley Rose, P.C.

(57) ABSTRACT

A bend stiffener assembly for coupling a tubular member includes a nonmetallic flange member having a central bore for receiving a tubular member and an elastomeric member coupled to the flange member and having a central bore for receiving the tubular member, wherein the elastomeric member is configured to provide a bending resistance to a tubular member extending therethrough.

13 Claims, 16 Drawing Sheets

(56) References Cited

U.S. PATENT DOCUMENTS

| | | | | |
|---|---|---|---|---|
| 4,345,786 A | * | 8/1982 | Egert | F16L 39/02 |
| | | | | 285/124.1 |
| 4,382,619 A | * | 5/1983 | Grisebach | F16L 39/02 |
| | | | | 285/124.4 |
| 4,489,961 A | * | 12/1984 | Laidig | F16L 33/225 |
| | | | | 285/116 |
| 4,995,646 A | * | 2/1991 | Johnston | H02G 3/0675 |
| | | | | 285/124.3 |
| 5,181,750 A | * | 1/1993 | Reum | F16L 33/30 |
| | | | | 285/115 |
| 5,246,254 A | * | 9/1993 | LoJacono, Jr. | F16L 11/127 |
| | | | | 138/109 |
| 5,333,650 A | * | 8/1994 | Folkman | F16L 33/34 |
| | | | | 285/116 |
| 5,336,850 A | * | 8/1994 | Mitsch | H02G 15/04 |
| | | | | 174/653 |
| 6,267,143 B1 | * | 7/2001 | Schick | G01N 30/20 |
| | | | | 285/124.3 |
| 6,494,496 B1 | * | 12/2002 | Sweeney | F16L 35/00 |
| | | | | 285/115 |
| 7,014,222 B1 | * | 3/2006 | Poppe | F16L 39/00 |
| | | | | 285/124.3 |
| 7,357,424 B2 | * | 4/2008 | Powell | F16L 57/06 |
| | | | | 285/115 |
| 7,467,662 B2 | | 12/2008 | Smith | |
| 8,016,520 B2 | | 9/2011 | Dybvik et al. | |
| 8,100,182 B2 | | 1/2012 | Smith et al. | |
| 8,141,909 B2 | | 3/2012 | Clover et al. | |
| 2006/0186661 A1 | * | 8/2006 | Levan | B60D 1/62 |
| | | | | 285/114 |
| 2010/0052316 A1 | | 3/2010 | Smith | |
| 2011/0147047 A1 | | 6/2011 | Madden | |

* cited by examiner

BEND STIFFENER ASSEMBLY

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

The disclosure relates generally to equipment used in the transmission of signals or materials through tubular members, such as umbilicals. More particularly the disclosure relates to bend stiffeners for protecting the terminal ends of umbilicals or other tubular members configured for transmitting signals or materials.

In some industrial operations, an umbilical is used to transfer or transmit power, materials, and communication signals between systems at different locations. For instance, umbilicals are often used in offshore oil and gas drilling and production operations for transmitting power, chemicals, and communication signals. In offshore operations signals and materials may need to be transferred between various components of the offshore system, including surface platforms, subsea production trees, manifolds, jumpers, sleds, controls, wells and the like. In offshore operations, umbilicals may be used to transfer pressurized hydraulic fluid for powering subsea hydraulic systems, chemicals for injection into a production stream, and/or data to and from subsea components of the offshore system. However, umbilicals may also be used on land oil and gas drilling and production operations, and in other industrial applications.

Umbilicals often comprise an outer sheath or tubular member configured for service in the environment of the particular application. For instance, the outer sheath of the umbilical may be configured for use subsea in an offshore oil and gas drilling and production operation. Disposed within the outer sheath of the umbilical may be a plurality of hoses and cables, with each hose or cable configured to transfer materials, power, or signals and the like. In this configuration, the hoses disposed within the outer sheath are protected from the outside environment by the sheath. The terminal ends of the umbilical couple to termination assemblies, which include connectors for coupling to the plurality of hoses disposed within the outer sheath of the umbilical. The termination assembly sometimes includes a bend stiffener for coupling the terminal end of the umbilical to the termination assembly. Bend stiffeners may be configured to resist bending of the umbilical at the terminal assembly to prolong the service life of the umbilical. Bend stiffeners sometimes include a flange or other coupler that is exposed to the surrounding environment and is configured for mating to a corresponding coupler of the termination assembly. The bend stiffener may also include means for arranging the hoses within the outer sheath of the umbilical, such as potting material or metal grating or arrangement assemblies. However, metallic components (e.g., flange and arrangement means of the bend stiffener) are often high density and subject to corrosion in some service environments. Also, some means for securing and arranging the hoses within the outer sheath of the umbilical, such as potting material and the like, may be cumbersome to install and may not adequately secure the hoses within the assembly.

BRIEF SUMMARY OF THE DISCLOSURE

In some embodiments, a bend stiffener assembly includes only non-metallic components that are low mass and are suitable for varying service environments, including subsea environments. In certain embodiments, the bend stiffener assembly include an arrangement member that is convenient to install and adequately secures the hoses disposed within the outer sheath of the umbilical.

Some embodiments of a bend stiffener assembly for coupling a tubular member include a nonmetallic flange member having a central bore for receiving a tubular member and an elastomeric member coupled to the flange member and having a central bore for receiving the tubular member, wherein the elastomeric member is configured to provide a bending resistance to a tubular member extending therethrough. In some embodiments, the central bore of the flange member has a frustoconical inner surface. In some embodiments, the bend stiffener assembly also includes an arrangement member disposed in the bore and configured to couple with a cable disposed in the tubular member, wherein the arrangement member includes a frustoconical outer surface for physically engaging the frustoconical inner surface of the central bore of the flange member. In certain embodiments, the flange member is configured to provide a radially inward clamping force on an outer surface of the arrangement member in response to a compressive force applied to a front face of the arrangement member. In certain embodiments, the arrangement member includes a plurality of circumferentially spaced bores extending axially therethrough. In some embodiments, the arrangement member includes a plurality of circumferentially spaced slots, wherein each circumferentially spaced slot extends radially between one of the circumferentially spaced bores and the outer surface of the arrangement member. In some embodiments, each circumferentially spaced slot is configured to receive a cable of the tubular member.

Some embodiments of a bend stiffener assembly for coupling a tubular member include a flange member having a central bore for receiving a tubular member, wherein the central bore has a frustoconical inner surface, an elastomeric member coupled to the flange member and having a central bore for receiving the tubular member, wherein the elastomeric member is configured to provide a bending resistance to a tubular member extending therethrough, and an arrangement member disposed in the bore and configured to couple with a cable disposed in the tubular member, wherein the arrangement member includes a frustoconical outer surface for physically engaging the frustoconical inner surface of the central bore of the flange member. In some embodiments, the flange member is formed from a nonmetallic material. In some embodiments, the flange member is configured to provide a radially inward clamping force on an outer surface of the arrangement member in response to a compressive force applied to a front face of the arrangement member. In certain embodiments, the arrangement member includes a plurality of circumferentially spaced bores extending axially therethrough. In certain embodiments, the arrangement member includes a plurality of circumferentially spaced slots, wherein each circumferentially spaced slot extends radially between one of the circumferentially spaced bores and the outer surface of the arrangement member. In some embodiments, each circumferentially spaced slot is configured to receive a cable of the tubular member.

Some embodiments of a bend stiffener assembly for coupling a tubular member include a flange member having a central bore for receiving a tubular member, an elastomeric member coupled to the flange member and having a central bore for receiving the tubular member, wherein the elastomeric member is configured to provide a bending resistance to a tubular member extending therethrough, and an arrangement member disposed in the bore and configured to couple with a cable disposed in the tubular member, wherein the flange member is configured to provide a radially inward clamping force on an outer surface of the arrangement member in response to a compressive force applied to a front face of the arrangement member. In some embodiments, the flange member is formed from a nonmetallic material. In some embodiments, the central bore of the flange member has a frustoconical inner surface. In certain embodiments, the arrangement member includes a frustoconical outer surface for physically engaging the frustoconical inner surface of the central bore of the flange member. In certain embodiments, the arrangement member includes a plurality of circumferentially spaced bores extending axially therethrough. In some embodiments, the arrangement member includes a plurality of circumferentially spaced slots, wherein each circumferentially spaced slot extends radially between one of the circumferentially spaced bores and the outer surface of the arrangement member. In some embodiments, each circumferentially spaced slot is configured to receive a cable of the tubular member.

It is to be understood that both the foregoing general description and the following detailed description are exemplary of the disclosure and are intended to provide an overview or framework for understanding the nature and character of the apparatuses and methods that are disclosed and claimed. The accompanying drawings are included to provide a further understanding of the disclosure and are incorporated in and constitute a part of this specification. The drawings illustrate various exemplary embodiments of the disclosure and together with the written description serve to explain certain principles and operation of the disclosed embodiments.

BRIEF DESCRIPTION OF THE DRAWINGS

For a detailed description of the disclosed embodiments, reference will now be made to the accompanying drawings in which.

DETAILED DESCRIPTION OF THE DISCLOSED EMBODIMENTS

Figure 1:
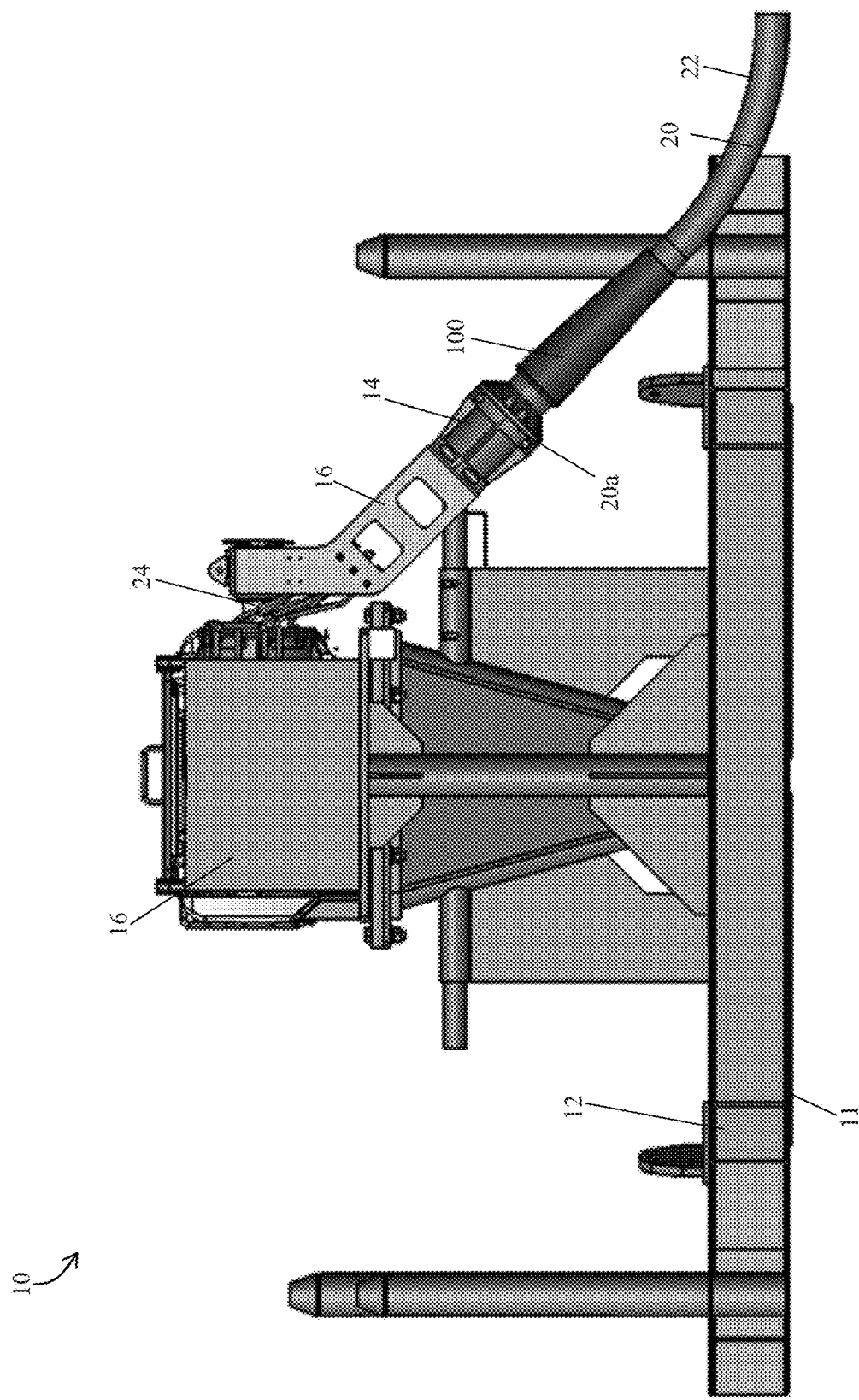
FIG. 1 is a schematic view of an embodiment of an umbilical termination assembly in accordance with principles disclosed herein.

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices, components, and connections. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis.

A bend stiffener assembly and method are proposed for providing a bend stiffener having, in some embodiments, all nonmetallic components, including a nonmetallic flange member and a nonmetallic hose arrangement member. In certain embodiments, the nonmetallic components comprising the bend stiffener are low density having a specific gravity similar to water and include an extended service life in common environmental conditions while also providing adequate strength and durability. The bend stiffener assembly is generally configured to protect an umbilical or other cable, flexible riser, flowline and the like, and protect the umbilical or other cable at the cable's termination point. In particular, the bend stiffener assembly is configured to resist dynamic and/or static bending loads on the cable such that the cable is prevented from bending below a minimum bend radius in response to bending loads applied to the cable from the surrounding environment. The bend stiffener assembly is also configured to couple the umbilical or other cable to a termination assembly. Further, the bend stiffener assembly is also configured to arrange the position of any hoses and/or cables disposed within an outer sheath of an umbilical.

An embodiment of the bend stiffener assembly generally includes a nonmetallic flange member, an elastomeric member, and a nonmetallic arrangement member. The flange member of the bend stiffener assembly is generally configured to couple a terminal end of an umbilical or other cable to a termination assembly or other member. For instance, in an embodiment the flange member may couple the terminal end of an umbilical to a subsea structure. The elastomeric member of the bend stiffener assembly is generally configured to resist bending loads applied to the cable by the surrounding environment. In an embodiment, the bend resistance provided by the elastomeric member may vary along the member's axial length. For instance, in this embodiment the elastomeric member may include a body having a generally frustoconical outer surface and a central bore defined by a generally cylindrical inner surface. In this embodiment, the thickness of the body of the elastomeric member varies between a maximum point at a first axial end of the member, and a minimum at a second axial end of the elastomeric member, where the thickness of the body affects the level of bend resistance offered by the member. In this embodiment, the base of the elastomeric member may be disposed proximal the termination point of the cable. The arrangement member of the bend stiffener assembly is generally configured to arrange and secure one or more hoses or other tubular members disposed in an outer tubular sheath. In an embodiment, the arrangement member is configured to be oversized with respect to the flange member, such that when the bend stiffener assembly is coupled to a termination assembly, the arrangement member is placed into compression. In this embodiment, the compression force applied to the arrangement member may be configured to provide a clamping force to the hoses disposed in the arrangement member, thus further securing and affixing the hoses to the arrangement member. In this embodiment, the arrangement member may have a generally frustoconical body configured to physically engage a generally conical inner surface of the flange member. In this configuration, a compression force applied to a face of the arrangement member may be converted into a clamping force via physical engagement between the conical surfaces of the arrangement member and the flange member.

Referring to FIG. 1, an embodiment of a termination assembly 10 is shown. In this embodiment, termination assembly 10 generally includes a subsea frame or support pad 12 disposed on the sea floor 11, an armor pot 14, an umbilical termination head 16, an umbilical 20, and a bend stiffener assembly 100. In this embodiment, termination assembly 10 is configured to provide signal, power, and fluid communication between a topside umbilical termination assembly (TUTA) coupled to topside (i.e., above the waterline) control equipment that supplies the signal, power, and fluids transported by the umbilical, and one or more production wells of a subsea production system. The umbilical 20 generally includes an outer sheath or tubular member 22 and a plurality of hoses or cables 24 disposed therein. Cables 24 are configured to individually transport the signal, power, and fluids between TUTA and the subsea termination assembly 10. Cables 24 may include chemical injection tubes, hydraulic supply tubes, electrical control signal cables, electrical power cables, fiber optic cables, tubes for gas lift operations and the like. The outer sheath 22 of umbilical 20 is configured to protect the cables 24 from the surrounding service environment, and thus, the sheath 22 is configured to seal the cables 24 from the surrounding environment. Cables 24 are individually coupled to the termination head 16, which provides a connection to each individual cable 24 for subsea production wells or other components. For instance, flowlines or jumpers may couple different cables 24 to multiple other subsea components, such as to a plurality of subsea production wells. In this configuration, a single umbilical 20 may provide signal, power, and fluid communication to a plurality of subsea components, such as a plurality of subsea production wells, via the subsea termination assembly 10. Disposed between the connection head 16 and the terminal end 20a of umbilical 20 is an armor pot 14, which is configured to couple the bend stiffener assembly 100 and umbilical 20 to the connection head 16.

Bend stiffener 100 is generally configured to terminate umbilical 20 and to couple umbilical 20, and its associated cables 24, to the connection head 16 of termination assembly 10. Bend stiffener 100 is further configured to provide stiffness or resistance against static and dynamic loads applied to umbilical 20 through the surrounding environment. For instance, loads applied to umbilical 20 may produce a bending moment about terminal end 20a of umbilical 20, which is affixed to the termination head 16 via armor pot 14. The bending moment about termination point 20a, if not resisted, may induce bending of the umbilical 20, thus shortening the service life and possibly damaging the umbilical 20. Therefore, bend stiffener assembly 100 is configured to provide bending stiffness to umbilical 20 proximal termination point 20a, and to prevent umbilical 20 from bending beyond a prescribed minimum bend radius (MBR) of the umbilical 20.

While in the embodiment shown in FIG. 1 bend stiffener assembly 100 is shown as a component of subsea termination assembly 10, in other embodiments bend stiffener assembly 100 can be used in other contexts, either offshore or onshore. For instance, bend stiffener assembly 100 may be used with a TUTA at the surface, or for protecting jumpers, flowlines, and other tubular members used in offshore oil and gas drilling and production systems. In other embodiments, bend stiffener assembly 100 may be used for protecting cables used in onshore oil and gas drilling and production systems. Further, bend stiffener assembly 100 could also be used in other industrial and commercial applications using tubular members that require additional support to resist static and dynamic bending loads.

Figure 2A:
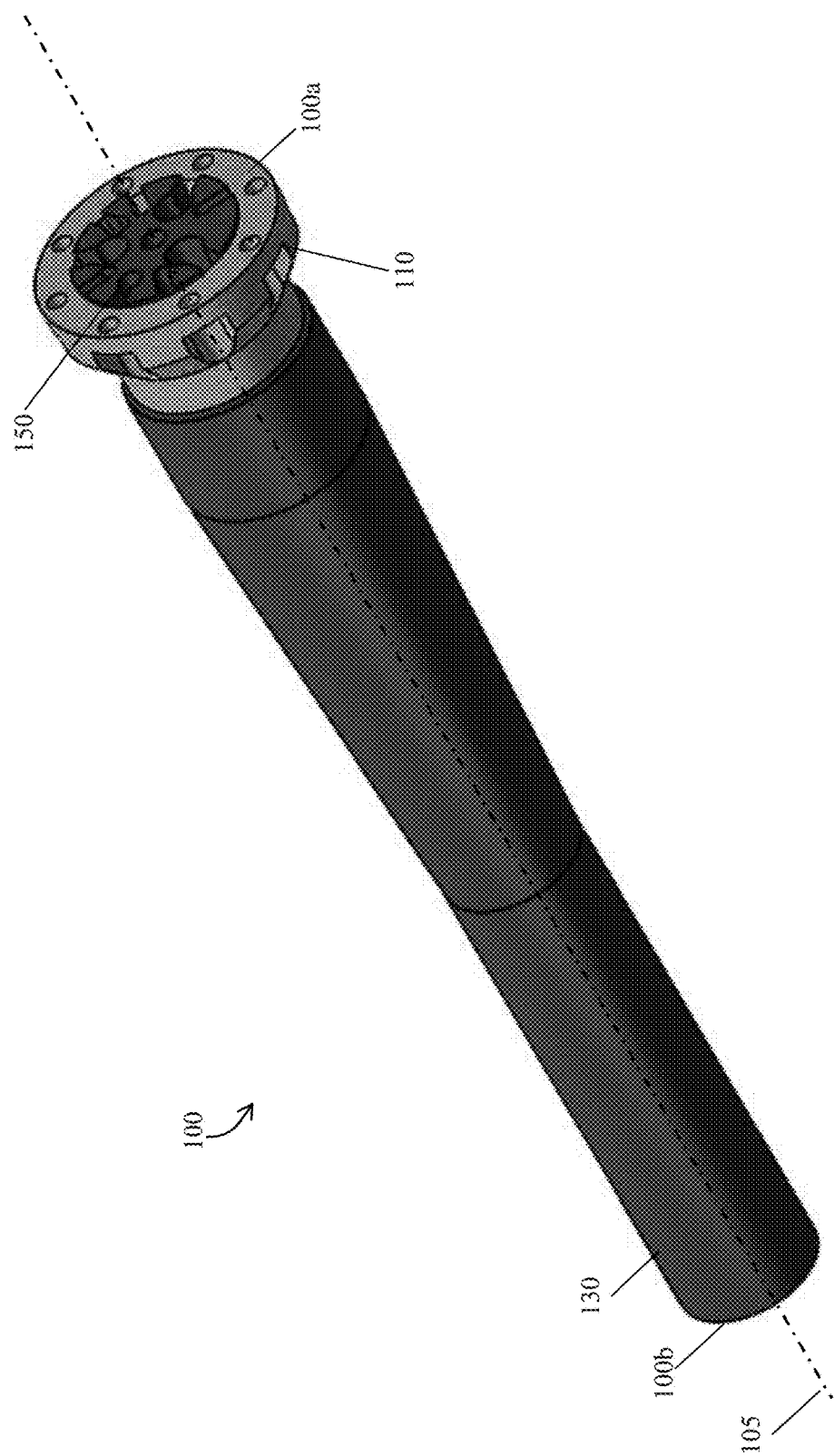
FIGS. 2A and 2B are perspective views of an embodiment of a bend stiffener assembly in accordance with principles disclosed herein.
Figure 2B:
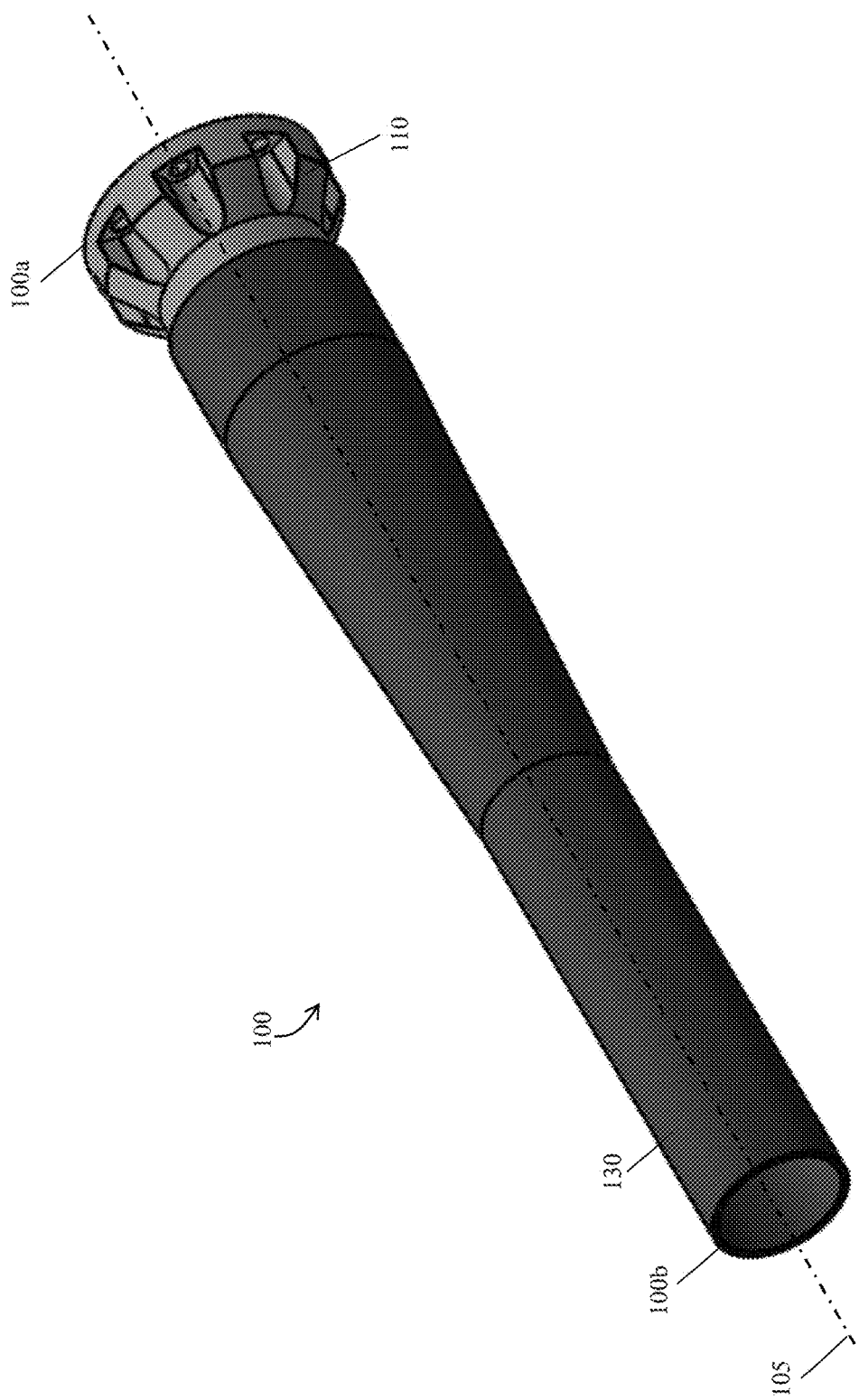
Figure 2C:
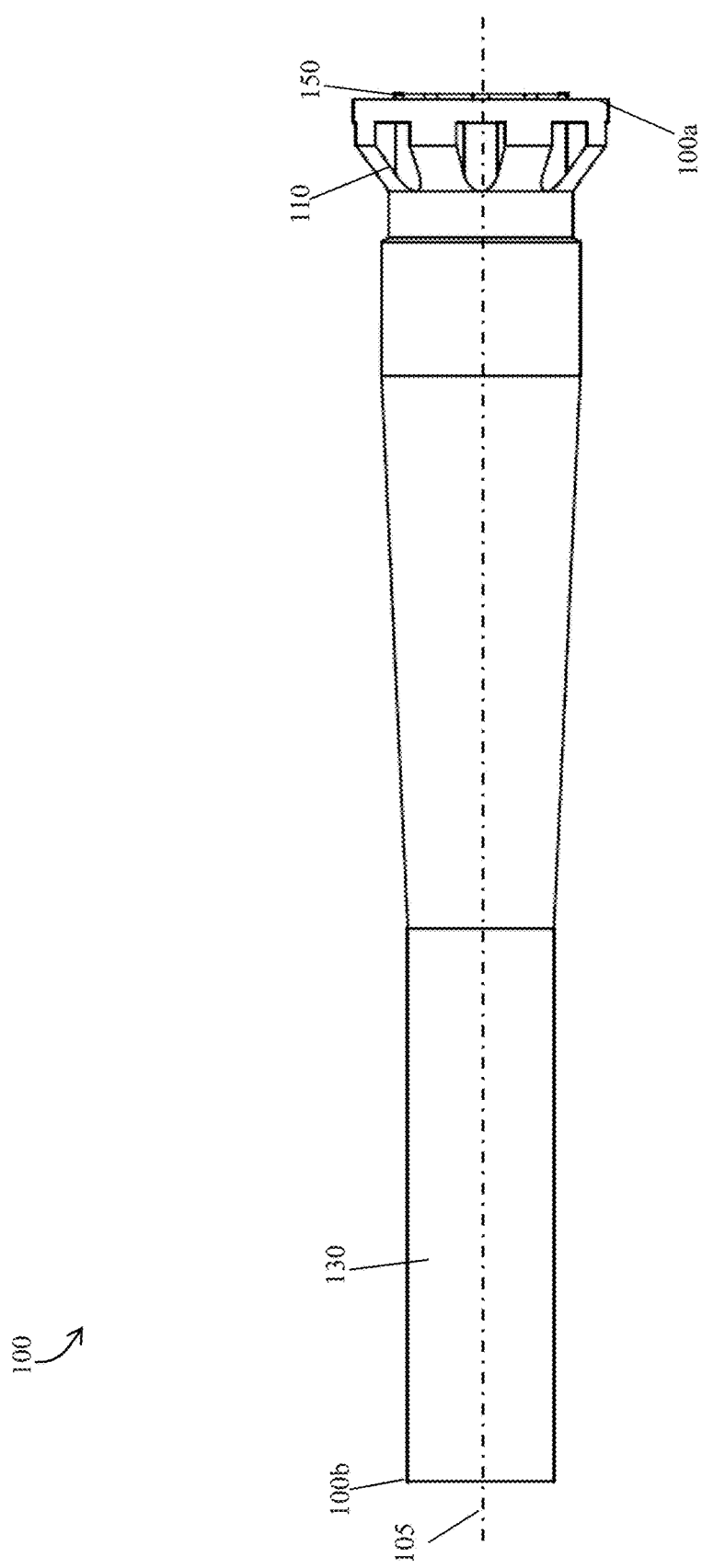
FIG. 2C is a front view of the bend stiffener assembly of FIGS. 2A and 2B.

Referring to FIGS. 2A-2C, an embodiment of bend stiffener assembly 100 is shown. In this embodiment, bend stiffener 100 has a first terminal end 100a, a second terminal end 100b, and a central or longitudinal axis 105 extending therebetween. Bend stiffener 100 generally includes a flange member 110 disposed at first end 100a, an elastomeric member 130 coupled to flange member 110 and extending to second end 100b, and an arrangement member 150 disposed in flange member 110 at first end 100a. Flange member 110 is generally configured to couple the bend stiffener assembly 100 to the armor pot 14 of termination assembly 10. Flange member 110 is also configured to have an extended service life in common environmental conditions. In this embodiment, flange member 110 is formed from nonmetallic materials having a specific gravity similar to water and a mass less than metallic materials. However, in other embodiments flange member 110 may be formed from other materials, including metallic materials.

Elastomeric member 130 is generally configured to provide resistance against bending loads applied to an umbilical disposed within member 130. In this embodiment, the bending resistance or stiffness provided by elastomeric member 130 varies along its axial length, with a maximum bending resistance provided proximal flange member 110 and a minimum bending resistance provided distal flange member 110 at second end 100b. However, in other embodiments elastomeric member 130 may be configured to provide a constant or fixed bending resistance along its axial length. Further, in other embodiments elastomeric member 130 may be configured to have a variable bending resistance along its axial length with a maximum resistance provided at an axial position other than the end proximal flange member 110. For instance, a maximum bending resistance could be provided at second end 100b or at other locations along the axial length of elastomeric member 130. Elastomeric member 130 is also configured to have an extended service life in common environmental conditions.

Arrangement member 150 is generally configured to arrange and secure hoses or cables disposed within an umbilical, such as umbilical 20 shown in FIG. 1, in relatively fixed circumferential and radial positions. Arrangement member 150 is also configured to help secure or couple the cables disposed within an umbilical to the bend stiffener assembly 100. While in this embodiment bend stiffener assembly 100 is shown as including arrangement member 150, in other embodiments bend stiffener assembly 100 may only include flange member 110 and elastomeric member 130. For instance, in this embodiment bend stiffener assembly 100 may be used in conjunction with tubular members other than umbilicals that do not include a plurality of internally disposed cables and hoses. Thus, arrangement member 150 would not be necessary in such an application.

Figure 3A:
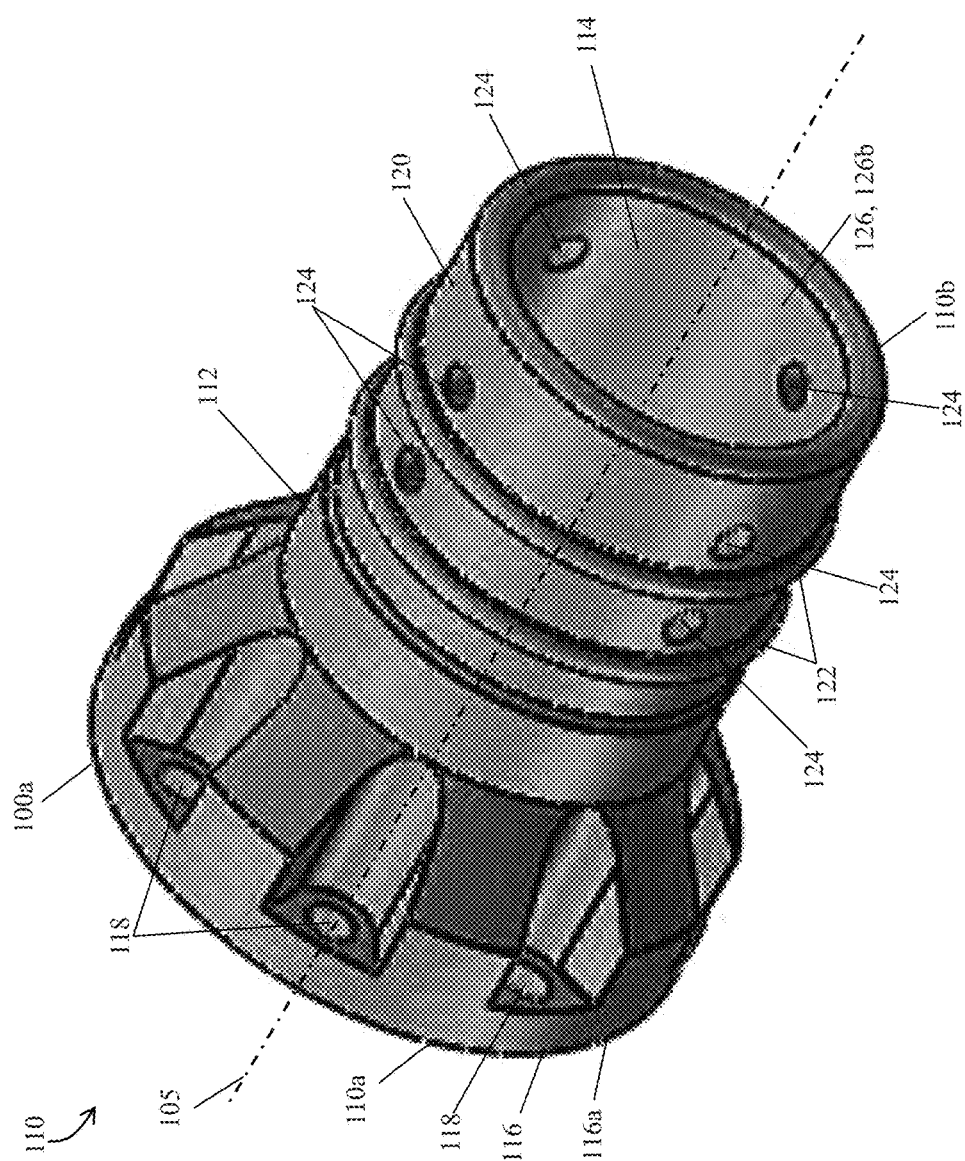
FIG. 3A is a perspective view of an embodiment of a flange member in accordance with principles disclosed herein.
Figure 3B:
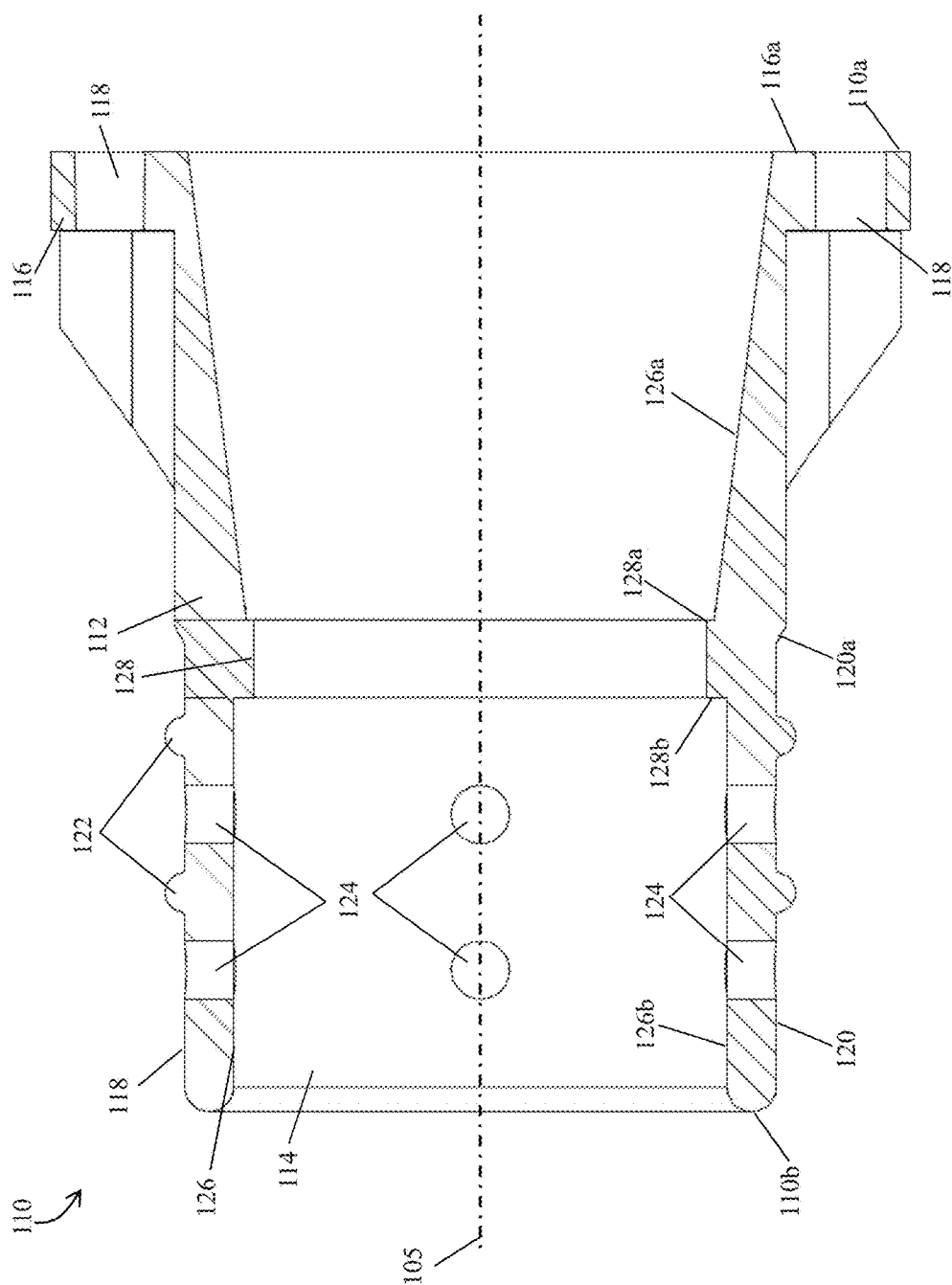
FIG. 3B is a side, cross-sectional view of the flange member of FIG. 3A.
Figure 3C:
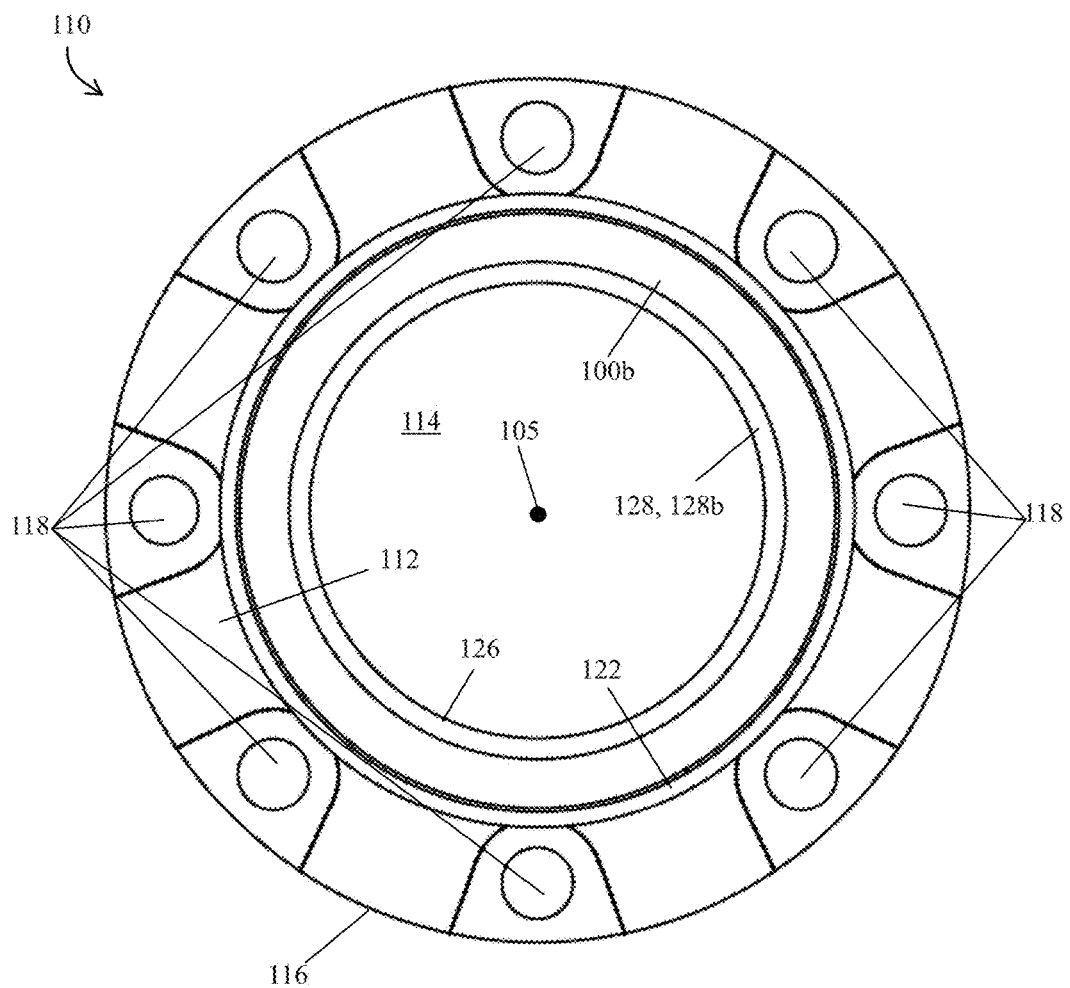
FIG. 3C is a front view of the flange member of FIG. 3A.

Referring to FIGS. 3A-3C, flange member 110 of bend stiffener assembly 100 is shown. Flange member 110 has a first terminal end 110a disposed at first end 100a of bend stiffener assembly 100 and a second terminal end 110b distal end 110a. Flange member 110 generally includes a generally cylindrical body 112 having a central or longitudinal bore 114 extending therethrough, where bore 114 is coaxial with longitudinal axis 105 of bend stiffener assembly 100. Body 112 of flange member 110 also includes a radially extending outer flange 116 having an annular face 116a disposed at first end 110a. While body 112 is shown as a single piece in FIGS. 3A-3C, in other embodiments body 112 may be two 180° components coupled together using a clamp, strap, or even using the elastomeric member 130. Outer flange 116 includes a plurality of circumferentially spaced apertures or holes 118 extending therethrough. In this embodiment, each aperture 118 is configured to receive a bolt for bolting or coupling the flange member 110 to the armor pot 14 of termination assembly 10. Thus, in this embodiment flange member 110 is configured to be bolted to termination assembly 10. However, in other embodiments flange member 110 may be configured to couple to armor pot 14 through other mechanisms besides bolting. For instance, in other embodiments flange member 110 may be welded to armor pot 14, strapped to armor pot 14 using a strap or clamp member, use coupling nuts embedded within apertures 118 for coupling to armor pot 14, as well as through other coupling mechanisms known in the art.

Body 112 of flange member 110 includes a generally cylindrical outer surface 120. Outer surface 120 of body 112 includes a plurality of axially spaced annular ribs 122 that extend radially therefrom and are disposed axially between flange 116 and second end 110b. Ribs 122 are generally configured to physically engage an inner surface of elastomeric member 130, thereby helping couple flange member 110 and elastomeric member 130, as will be explained further herein. Body 112 also includes a plurality of axially and circumferentially spaced apertures 124 that extend between the outer surface 120 and a generally cylindrical inner surface 126 of body 112, which defines bore 114. Apertures 124 are generally configured to provide empty space for elastomeric member 130 to deform into to reduce stress upon elastomeric member 130 during service and to help couple the flange member 110 and elastomeric member 130. Outer surface 120 also includes an annular, radially extending shoulder 120a disposed axially between flange 116 and annular ribs 122.

Referring particularly to FIG. 3B, body 112 also includes an inner flange 128 that extends radially into bore 114. Flange 128 includes a front annular face 128a directed towards first end 110a and an opposing rear face 128b directed towards second end 110b. Inner surface 126 of body 112 includes a first or frustoconical portion 126a that extends axially between first end 110a and front face 128a of inner flange 128 and a cylindrical portion 126b that extends axially between second end 110b and rear face 128b of inner flange 128. Frustoconical portion 126a of inner surface 126 is configured to physically engage a corresponding frustoconical surface of arrangement member 150 to provide a radially inward force to member 150, as will be explained further herein. Also, front face 128a of inner flange 128 is configured to physically engage and provide an axially compressive force on arrangement member 150, as will be explained further herein.

Figure 4:
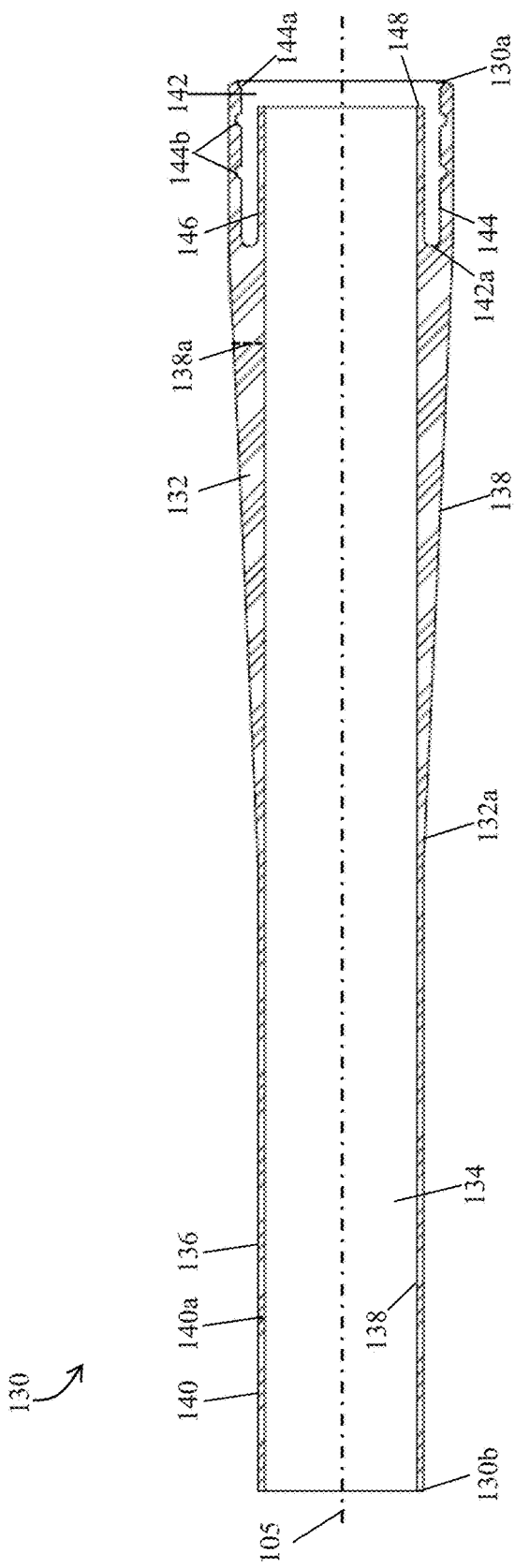
FIG. 4 is a side, cross-sectional view of an embodiment of an elastomeric member in accordance with principles disclosed herein.

Referring now to FIG. 4, an embodiment of elastomeric member 130 is shown. In this embodiment, elastomeric member 130 has a first terminal end 130a, a second terminal end 130b, and includes a body 132 having a central or longitudinal bore 134 extending therethrough, where bore 134 is disposed coaxially with longitudinal axis 105 of bend stiffener assembly 100. Body 132 includes a generally cylindrical outer surface 136 and a generally cylindrical inner surface 138 defining bore 134. Body 132 includes an inflection point 132a that divides body 132 into a first portion 138 extending between point 132a and first end 130a and having a cross-section 138a that varies along its axial length, and a second portion 140 extending between second end 130b and point 132a and having an axially constant cross-section 140a. Body 132 also includes a generally annular groove 142 that extends axially into body 132 from first end 130a to a terminal end 142a. Annular groove 142 is configured to receive flange member 110, allowing elastomeric member 130 to couple to flange member 110. Annular groove 142 is defined by a generally cylindrical outer groove surface 144 and a generally cylindrical inner groove surface 146. Annular groove 142 also forms an inner, annular flange 148 facing first end 130a and a conical groove 144a that extends radially into outer groove surface 144 at first end 130a. Outer groove surface 144 also includes a pair of axially spaced annular grooves 144b.

The amount of resistance to a static or dynamic bending load applied to elastomeric member 130 is dependent upon the cross-sectional size or material properties of body 132. Therefore, the amount of resistance or bending stiffness increases along the length of first portion 138 moving from inflection point 132a towards first end 130a of elastomeric member 130 until the terminal end 142a of annular groove 142, which decreases the cross-section 138a of first portion 138 of body 132. In contrast, since second portion 140 includes a constant cross-section 140a, the amount of bending stiffness provided by body 132 is relatively constant along the axial length of the second portion 140 of body 132. In this embodiment, the bending resistance provided by elastomeric member 130 is configured to increase moving from inflection point 132a towards first end 130a. In this arrangement, elastomeric member 130 is configured to resist higher bending loads applied towards first end 130a (excluding the axial length of body 132 penetrated by annular groove 142). Given that the umbilical 20 terminates, and is fixed at, flange member 110 and armor pot 14, bending loads applied to umbilical 20 may be maximized at its terminal or fixed end 20a. Thus, the axially increasing bending resistance offered by elastomeric member 130 may offset the higher bending loads applied to umbilical 20 near termination point 20a.

Figure 5A:
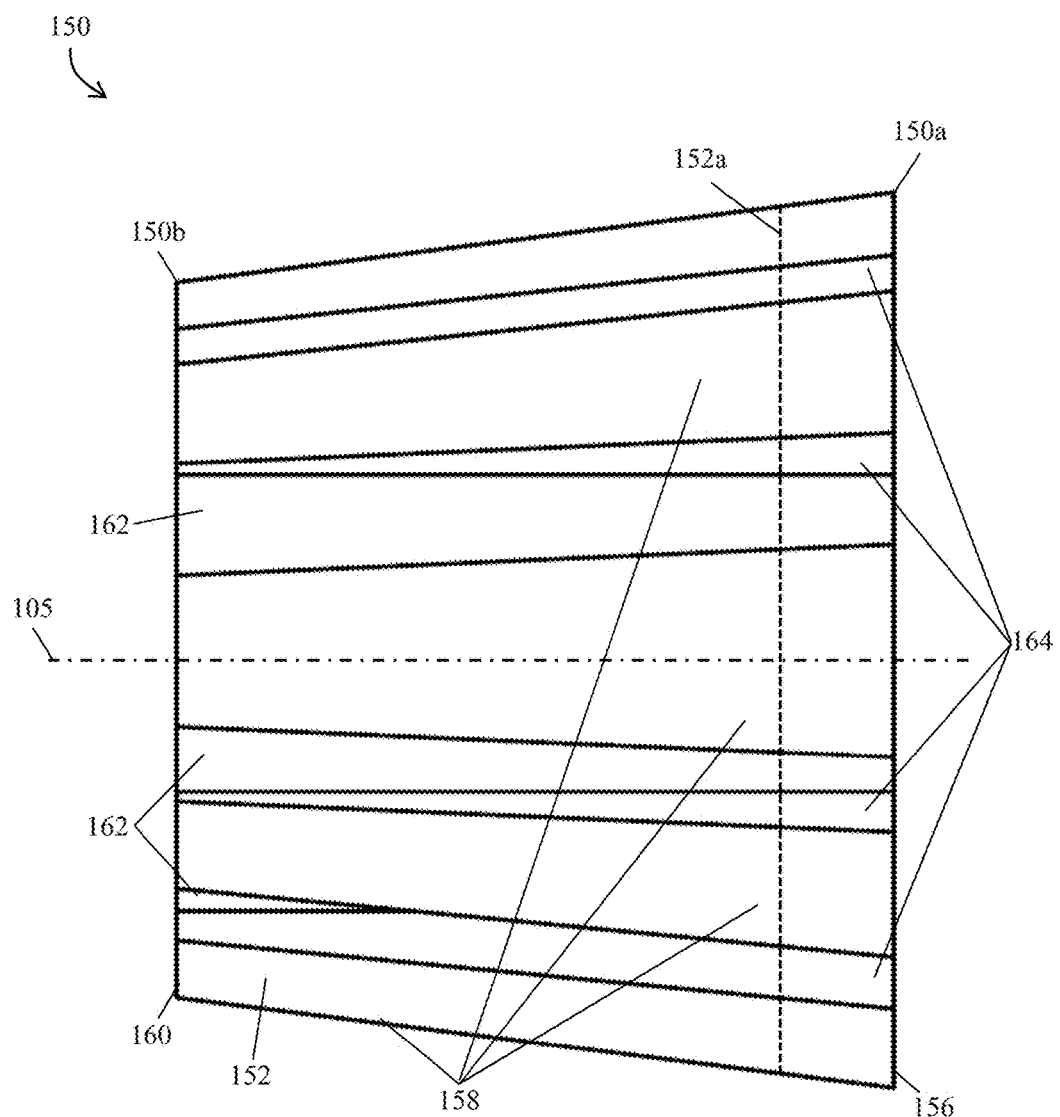
FIG. 5A is a side view of an embodiment of an umbilical arrangement member in accordance with principles disclosed herein.
Figure 5B:
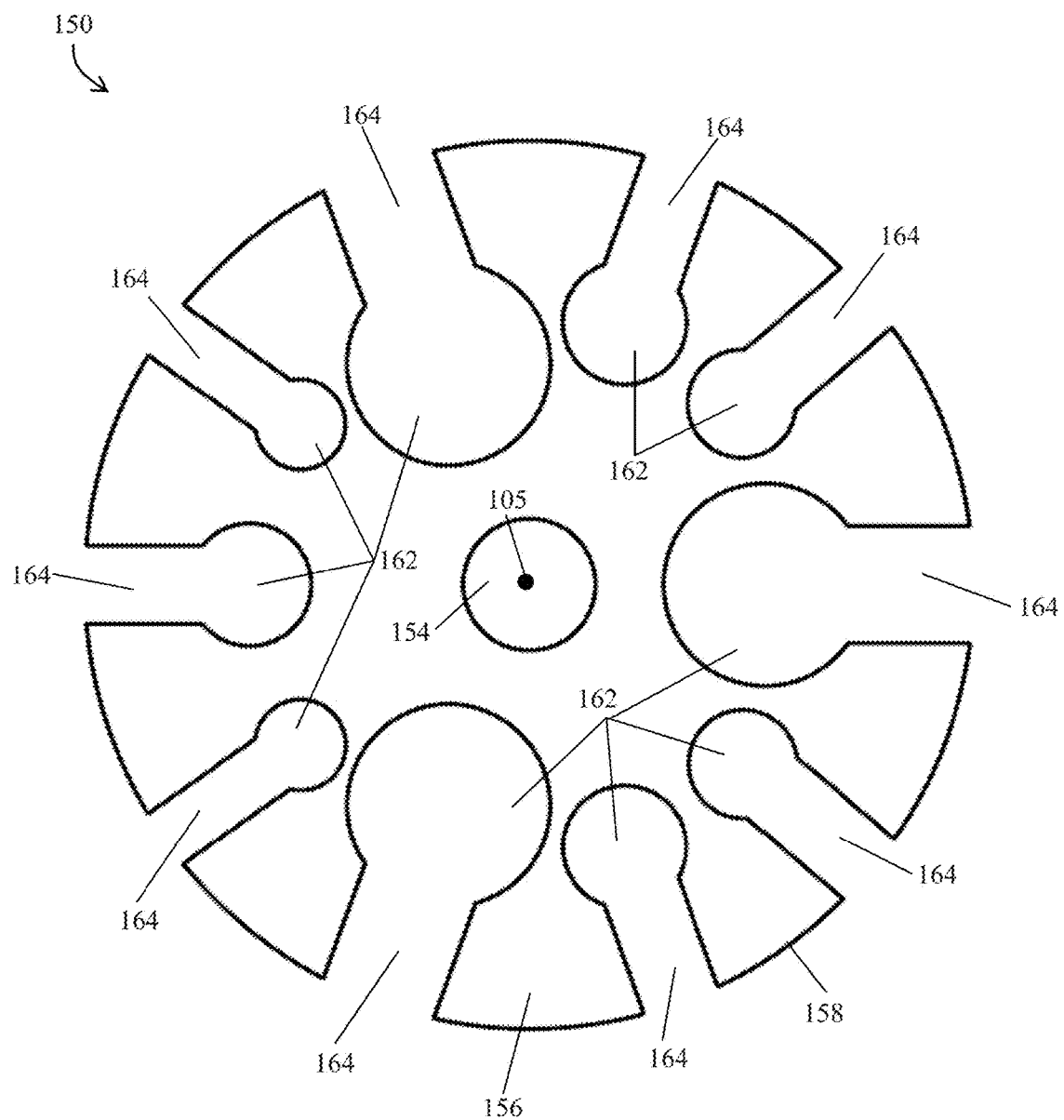
FIG. 5B is a rear view of the umbilical arrangement member of FIG. 5A.
Figure 5C:
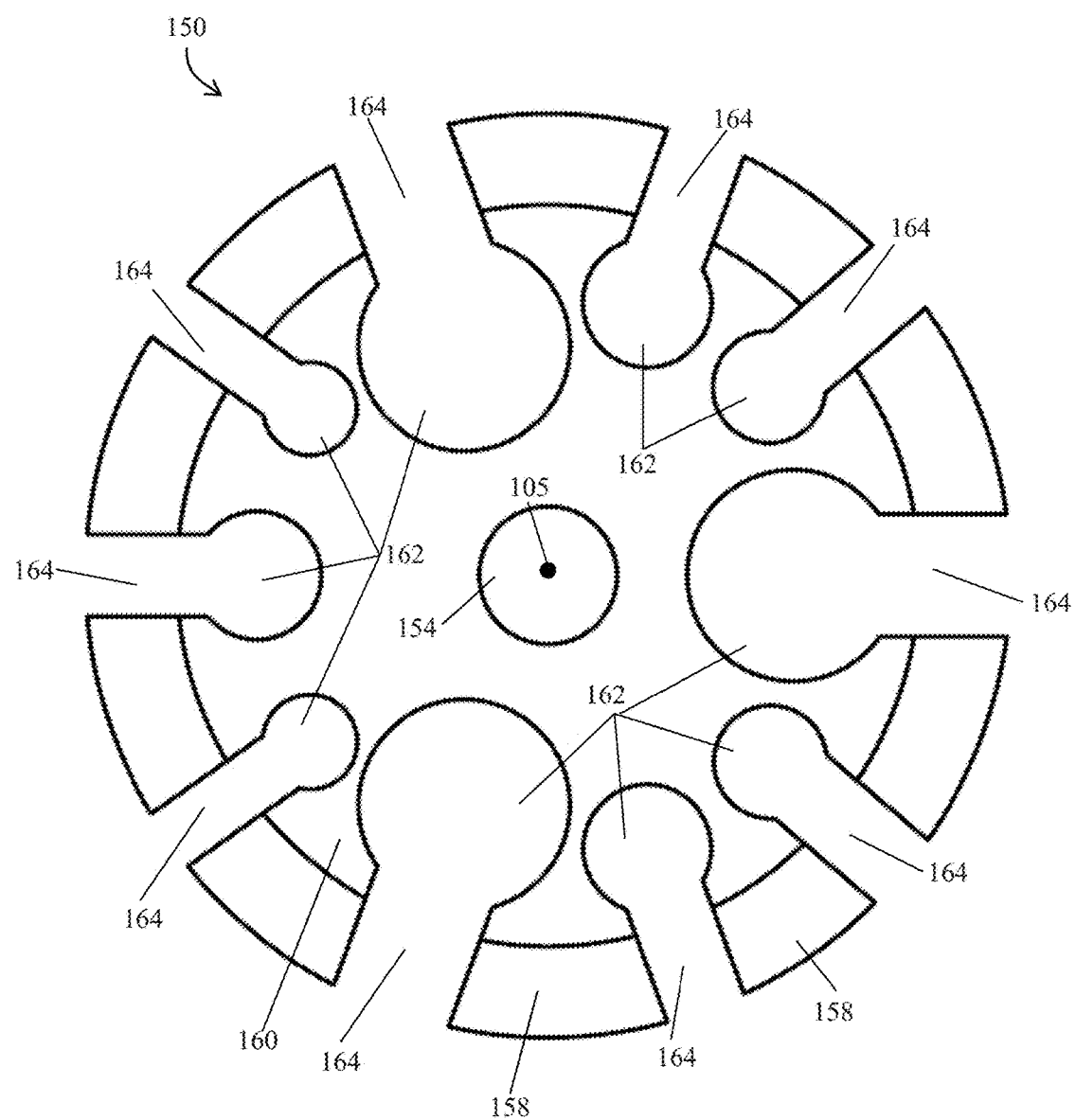
FIG. 5C is a front view of the umbilical arrangement member of FIG. 5A.

Referring now to FIGS. 5A-5C, an embodiment of an arrangement member 150 is shown. In this embodiment, arrangement member 150 has a first terminal end 150a, a second terminal end 150b, and includes a body 152 having a central or longitudinal bore 154 extending therethrough, where bore 154 is disposed coaxially with longitudinal axis 105 of bend stiffener assembly 100. Body 152 of arrangement member 150 includes a first or front surface 156, an axially extending and generally frustoconical outer surface 158, and a second or rear surface 160. Body 152 has a diameter 152a that varies generally linearly along the axial length of body 152, having a maximum diameter at first surface 156 and a minimum length at second surface 160. Body 152 also includes a plurality of circumferentially spaced and generally cylindrical bores 162 that are disposed about central bore 154 and extend axially between first end 150a and second end 150b. As shown in FIGS. 5A-5C, bores 162 are of varying diameters and are disposed at varying radial distances from longitudinal axis 105. Body 152 of arrangement member 150 further includes a plurality of circumferentially spaced slots 164, where each slot 164 extends axially between ends 150a, 150b, and radially between a bore 162 and outer surface 158. Also, each slot 164 includes a width 164w that is lesser than the diameter of the slot 164's respective circumferential bore 162.

While in the embodiment of arrangement member 150 illustrated in FIGS. 5A-5C body 152 is shown as including central bore 154, in other embodiments of arrangement member 150, body 152 may not include a longitudinal bore. Also, in other embodiments body 152 may include varying number of circumferential bores 162 having differing diameters, circumferential positions, and radial distances from longitudinal axis 105, than the body 152 illustrated in FIGS. 5A-5C. Further, in other embodiments body 152 may only include central bore 152 and not include any circumferential bores 162.

Figure 6:
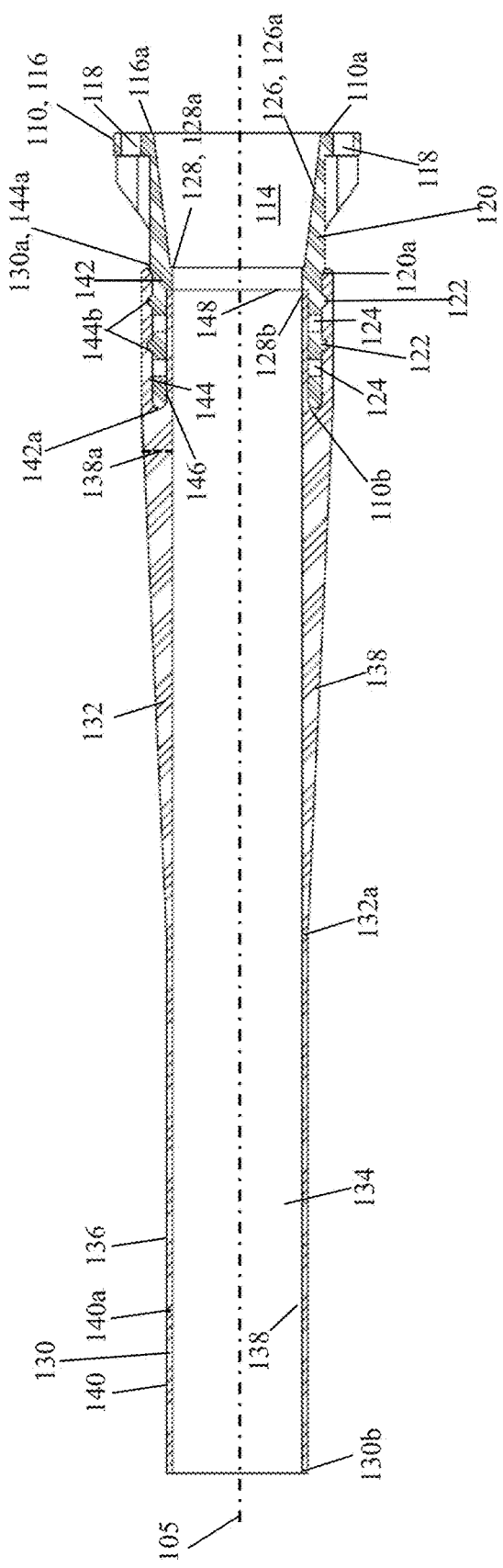
FIG. 6 is a side, cross-sectional view of the flange member of FIGS. 3A and 2C, and the elastomeric member of FIG. 4.
Figure 7:
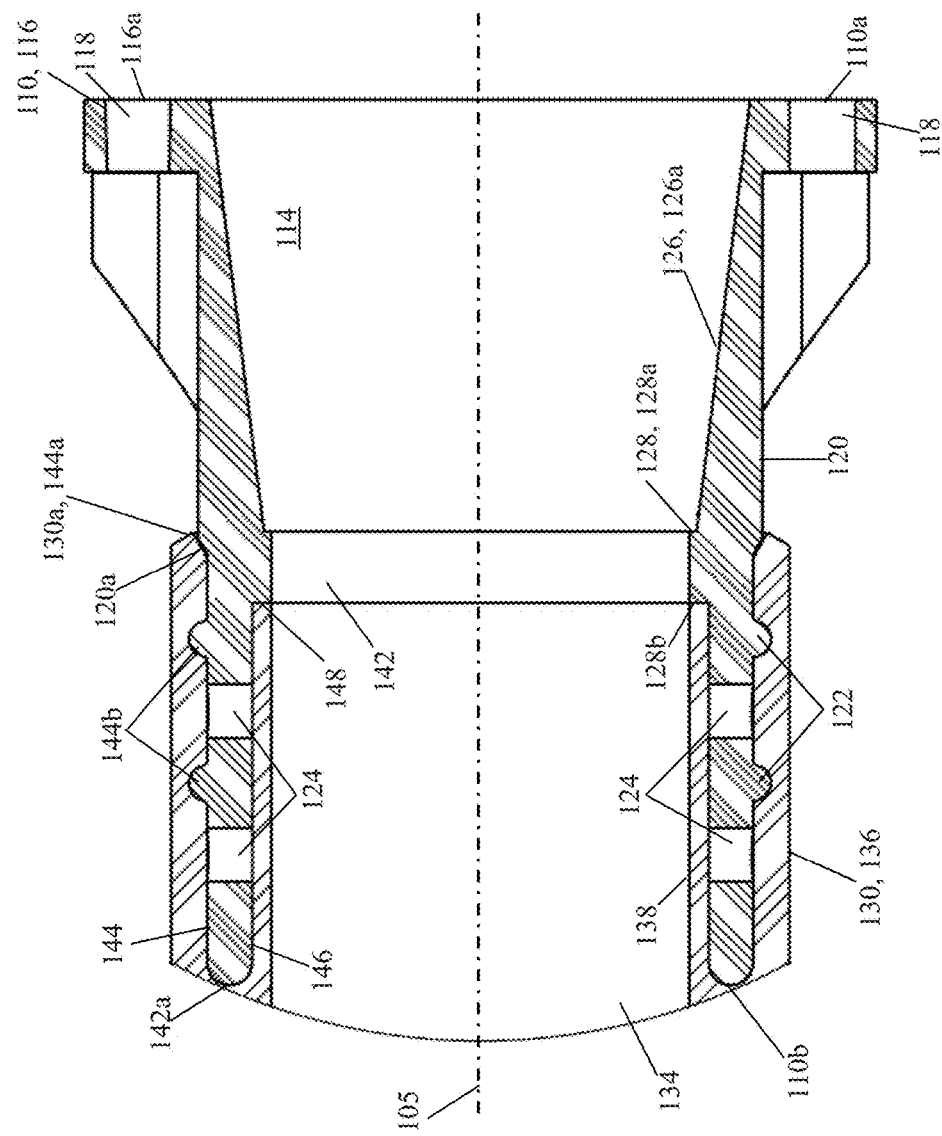
FIG. 7 is a zoomed-in side, cross-sectional view of the flange member of FIGS. 3A and 2C, and the elastomeric member of FIG. 4.

Referring now to FIGS. 6 and 7, bend stiffener assembly 100 is shown with flange member 110 coupled to elastomeric member 130. As shown, annular ribs 122 of flange member 110 extend into and physically engage annular grooves 144b of elastomeric member 130, thereby coupling flange member 110 to elastomeric member 130. Also, rear face 128b of the flange 128 of flange member 110 disposed adjacent, and may physically engage, annular flange 148 of elastomeric member 130. Further, radially extending shoulder 120a of flange member 110 is disposed adjacent, and may physically engage, conical groove 144a at first end 130a of elastomeric member 130.

Figure 8:
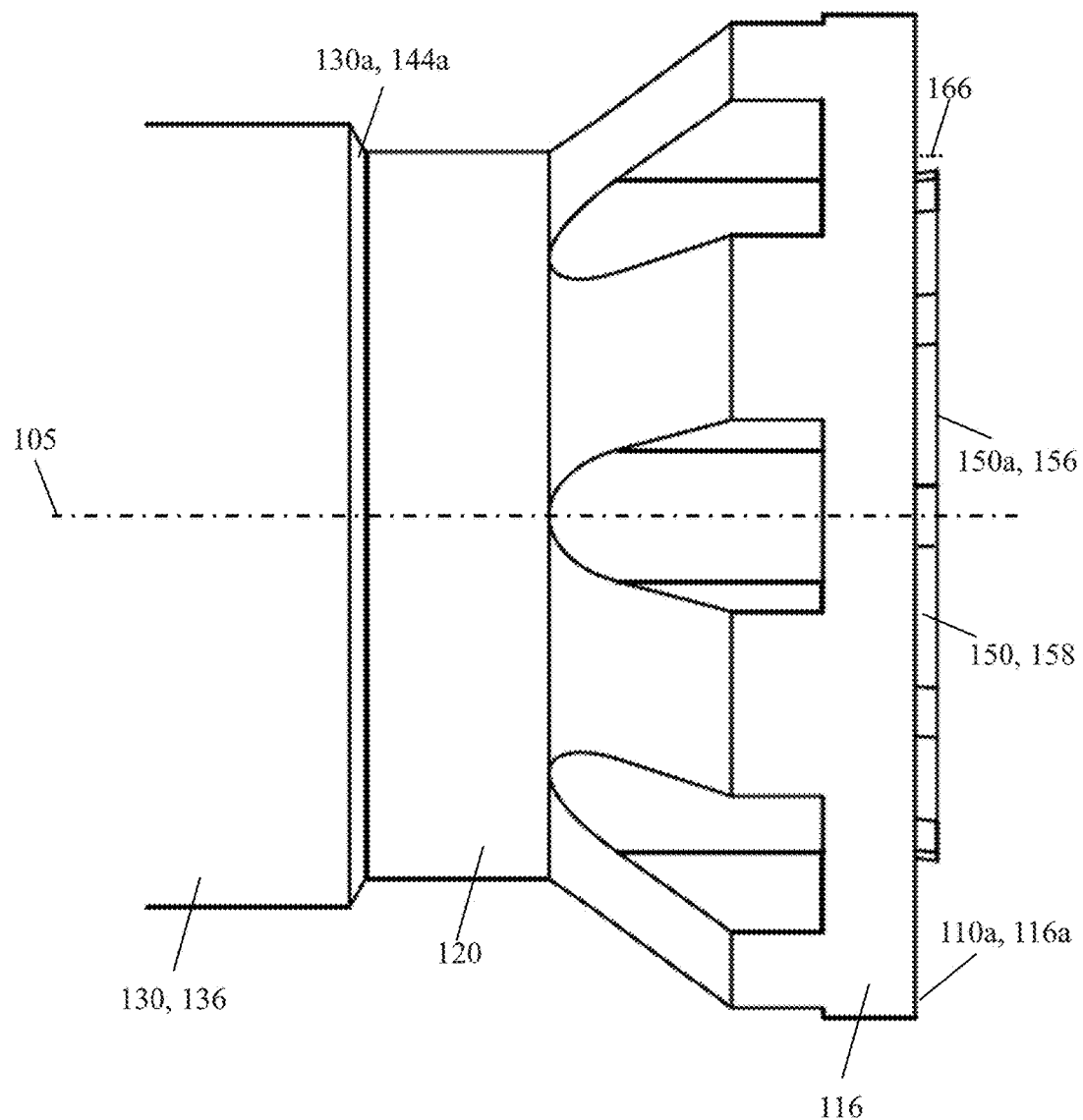
FIG. 8 is a zoomed-in, side view of the flange member of FIGS. 3A and 2C, and the umbilical arrangement member of FIG. 5A.
Figure 9:
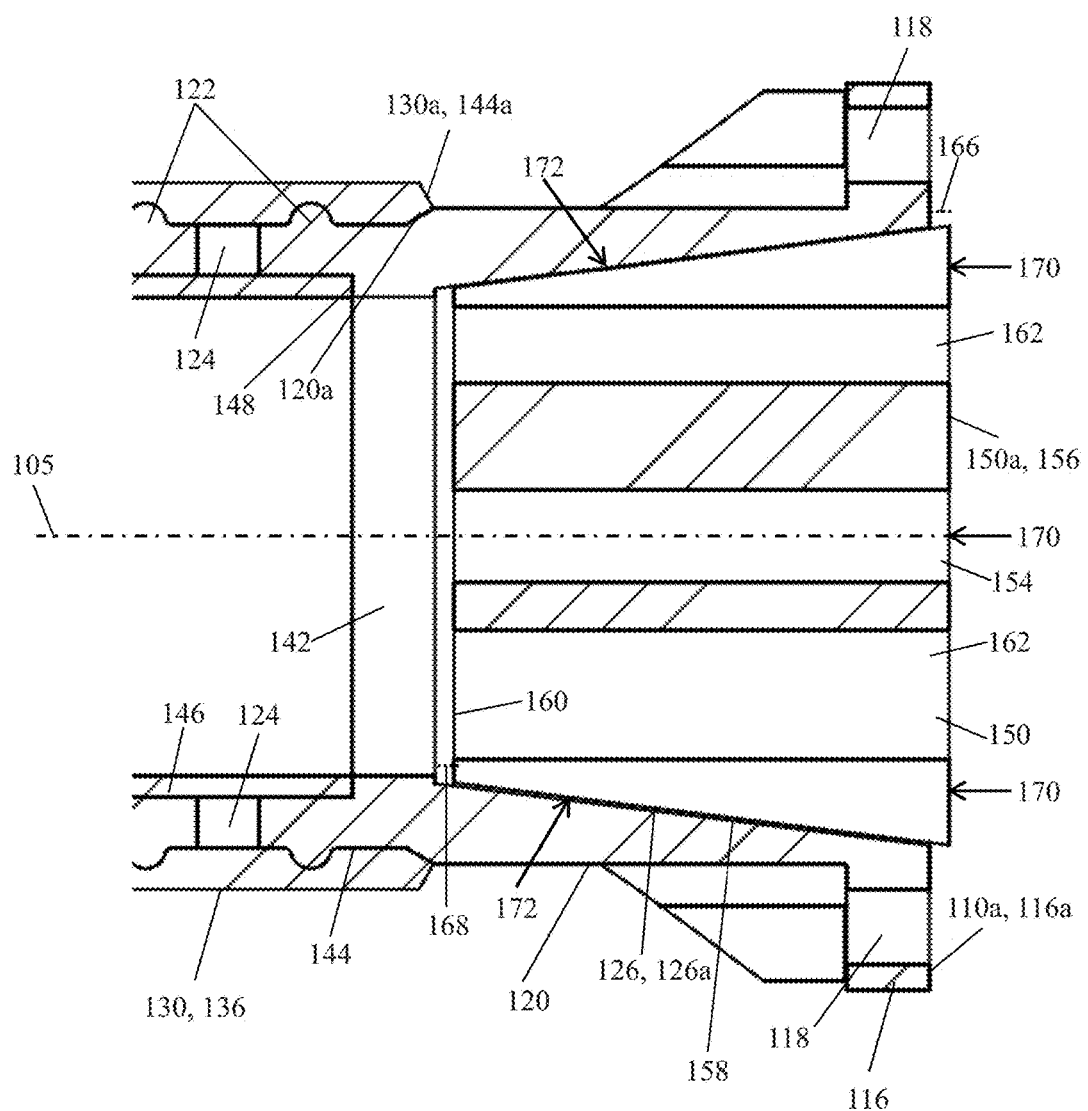
FIG. 9 is a zoomed-in, side cross-sectional view of the flange member of FIGS. 3A and 8, and the umbilical arrangement member of FIG. 5A.
Figure 10:
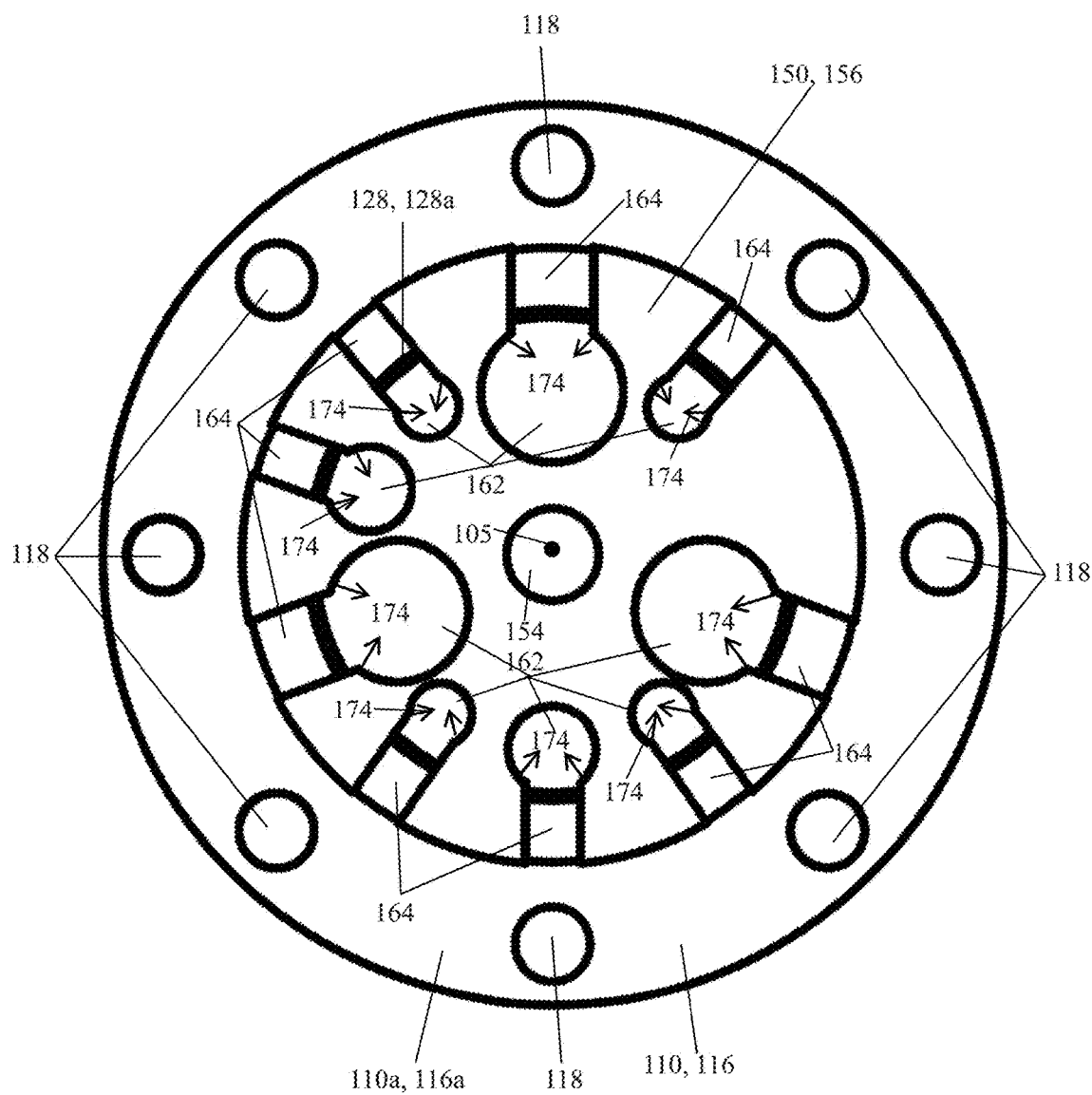
FIG. 10 is a zoomed-in, rear view of the flange member of FIG. 3A and the umbilical arrangement member of FIG. 5A.

Referring now to FIGS. 8-10, bend stiffener assembly 100 is shown with arrangement member 150 disposed in flange member 110 prior to coupling bend stiffener assembly 100 to an armor pot, such as armor pot 14 shown in FIG. 1. In this arrangement, frustoconical outer surface 158 of arrangement member is in physical engagement with frustoconical portion 126a of the inner surface 126 of flange member 110. Also, an axial space or gap 166 is disposed between rear surface 160 of arrangement member 130 and front face 128a of the flange 128 of flange member 110. Further, an axial lip or gap 168 also exists between first surface 156 of arrangement member 150 and first end 110a of flange member 110.

When bend stiffener assembly 100 is coupled to an armor pot or other terminator (flanged or otherwise), such as armor pot 14, an axial compressive force 170 is applied against the first surface 156 of arrangement member 130. Compressive force 170 against arrangement member 150 causes a reactive, radial compressive force 172 to be applied against outer surface 158 of arrangement member 150 via physical engagement between outer surface 158 of member 150 and portion 126a of the inner surface 126 of flange member 110. Thus, radially inward force 172 is applied circumferentially about outer surface 158 of arrangement member 150, putting the body 152 of arrangement member 150 into radial compression. The body 152 of arrangement member 150, being formed from an elastomeric material, moves or flows in response to compressive force 172, decreasing the width 162w of each circumferential bore 162. Further, compressive force 172 is transmitted radially through body 152, and applies a clamping force 174 to any tubular member disposed in circumferential bores 162 and central bore 154. In this manner, the frustoconical physical engagement between outer surface 158 of arrangement member 150 and the portion 126a of inner surface 126 of flange member 110, achieved through coupling bend stiffener assembly 100 to a corresponding component (e.g., an armor pot), is configured to provide a clamping force 174 on any tubular member disposed in bores 162 and 154, securing or coupling the tubular members to the arrangement member 150, and in turn, the bend stiffener assembly 100. While in this embodiment bend stiffener assembly 100 is described as being coupled to armor pot 14, in other embodiments assembly 100 may be coupled to other terminations, flanged or otherwise. Further, in an embodiment bend stiffener assembly 100 may replace the functionality of armor pot 14. For instance, the functionality provided by armor pot 14 may be replaced by a radially inward force 172 produced by the physical engagement between frustoconical surfaces 158 and 126c of arrangement member 150 and flange member 110, respectively.

Having described an embodiment of a bend stiffener assembly (i.e., bend stiffener assembly 100), a method of installing the embodiment of bend stiffener assembly 100 in a subsea termination assembly, such as subsea termination assembly 10, shall now be described. In an embodiment, a method of installing the bend stiffener 100 in the subsea termination assembly 10 may include terminating an umbilical, such as umbilical 20, in bend stiffener assembly 100, and then coupling the terminated umbilical 20 and bend stiffener assembly 100 to the armor pot and connection head, such as armor pot 14 and connection head 16, of subsea termination assembly 10. A method of terminating umbilical 20 generally includes inserting and extending umbilical 20 axially through the elastomeric member 130 and flange member 110 of bend stiffener assembly 100, including cables 24. Following insertion of umbilical 20, cables 24 of umbilical 20 are coupled to arrangement member 150. In particular, a cable 24 is disposed in longitudinal bore 154 of arrangement member 150 by extending the cable 24 axially through longitudinal bore 154. Cables 24 are also disposed in circumferential bores 162 of arrangement member 150. This may be done by either extending each cable 24 axially through its respective circumferential bore 162. Alternatively, each cable 24 may be displaced radially through their corresponding slot 164 such that they are disposed in a corresponding circumferential bore 162. Following the coupling of cables 24 to arrangement member 150, arrangement member is displaced axially into flange member 110 until frustoconical outer surface 158 of arrangement member is disposed adjacent to frustoconical portion 126a of the inner surface 126 of flange member 110. This method of terminating umbilical 20 may be performed onshore or at a platform at the surface of the water, or at other varying locations.

A method of coupling terminated umbilical 20 and bend stiffener assembly 100 to the connection head 16 of subsea termination assembly 10 generally includes disposing flange member 110 adjacent to a flange of armor pot 14, thereby providing an axial compressive force 170 on arrangement member 150, which is transmitted as a clamping force 174 to cables 24 of umbilical 20, further securing and coupling cables 24 to bend stiffener assembly 100, through the radially inward force 172 produced by the physical engagement between frustoconical surfaces 158 and 126c of arrangement member 150 and flange member 110, respectively. Following this, bolts may be extended through apertures 118 of flange member 110 and corresponding apertures of the flange of armor pot 14, thereby coupling flange member 110 and bend stiffener assembly 100 to armor pot 14 and connection head 16 of subsea termination assembly 10.

While in the methods described above bend stiffener assembly 100 is described as terminating and coupling umbilical 20 to subsea termination assembly 10, in other methods a bend stiffener assembly may be used to terminate and/or couple a tubular member either offshore or onshore to other types of assemblies and devices. For instance, bend stiffener assembly 100 may be used in methods for coupling with a TUTA at the surface, or for protecting jumpers, flowlines, and other tubular members used in offshore oil and gas drilling and production systems. In other methods, bend stiffener assembly 100 may be used for protecting cables used in onshore oil and gas drilling and production systems. Further, bend stiffener assembly 100 could also be used in other industrial and commercial applications using tubular members that require additional support to resist static and dynamic bending loads.

While preferred embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A bend stiffener assembly for coupling a tubular member, comprising:
    a nonmetallic flange member having a central bore for receiving a tubular member, wherein the central bore has a frustoconical inner surface;
    an elastomeric member coupled to the flange member and having a central bore for receiving the tubular member, wherein the elastomeric member is configured to provide a bending resistance to a tubular member extending therethrough; and
    are arrangement member disposed in the bore and configured to couple with a cable disposed in the tubular member, wherein the arrangement member includes a frustoconical outer surface for physically engaging the frustoconical inner surface of the central bore of the flange member;
    wherein the arrangement member includes a plurality of circumferentially spaced bores extending axially therethrough;
    wherein the arrangement member includes a plurality of circumferentially spaced slots, wherein each circumferentially spaced slot extends radially between one of the circumferentially spaced bores and the outer surface of the arrangement member.

2. The bend stiffener assembly of claim 1, wherein the flange member is configured to provide a radially inward clamping force on an outer surface of the arrangement member in response to a compressive force applied to a front face of the arrangement member.

3. The bend stiffener assembly of claim 1, wherein each circumferentially spaced slot is configured to receive a cable of the tubular member.

4. The bend stiffener assembly of claim 1, wherein an inner surface of the elastomeric member is coupled to an outer surface of the nonmetallic flange member.

5. A bend stiffener assembly for coupling a tubular member, comprising:
    a flange member having a central bore for receiving a tubular member, wherein the central bore has a frustoconical inner surface;
    an elastomeric member coupled to the flange member and having a central bore for receiving the tubular member, wherein the elastomeric member is configured to provide a bending resistance to a tubular member extending therethrough; and
    an arrangement member disposed in the bore and configured to couple with a cable disposed in the tubular member, wherein the arrangement member includes a frustoconical outer surface for physically engaging the frustoconical inner surface of the central bore of the flange member;
    wherein the arrangement member includes a plurality of circumferentially spaced bores extending axially therethrough;
    wherein the arrangement member includes a plurality of circumferentially spaced slots, wherein each circumferentially spaced slot extends radially between one of the circumferentially spaced bores and the outer surface of the arrangement member.

6. The bend stiffener assembly of claim 5, wherein the flange member is formed from a nonmetallic material.

7. The bend stiffener assembly of claim 5, wherein the flange member is configured to provide a radially inward clamping force on an outer surface of the arrangement member in response to a compressive force applied to a front face of the arrangement member.

8. The bend stiffener assembly of claim 5, wherein each circumferentially spaced slot is configured to receive a cable of the tubular member.

9. A bend stiffener assembly for coupling a tubular member, comprising:
- a flange member having a central bore for receiving a tubular member;
- an elastomeric member coupled to the flange member and having a central bore for receiving the tubular member, wherein the elastomeric member is configured to provide a bending resistance to a tubular member extending therethrough; and
- an arrangement member disposed in the bore and configured to couple with a cable disposed in the tubular member;
- wherein the flange member is configured to provide a radially inward clamping force on an outer surface of the arrangement member in response to a compressive force applied to a front face of the arrangement member;
- wherein the arrangement member includes a plurality of circumferentially spaced bores extending axially therethrough;
- wherein the arrangement member includes a plurality of circumferentially spaced slots, wherein each circumferentially spaced slot extends radially between one of the circumferentially spaced bores and the outer surface of the arrangement member.

10. The bend stiffener assembly of claim 9, wherein the flange member is formed from a nonmetallic material.

11. The bend stiffener assembly of claim 9, wherein the central bore of the flange member has a frustoconical inner surface.

12. The bend stiffener assembly of claim 11, wherein the arrangement member includes a frustoconical outer surface for physically engaging the frustoconical inner surface of the central bore of the flange member.

13. The bend stiffener assembly of claim 9, wherein each circumferentially spaced slot is configured to receive a cable of the tubular member.

\* \* \* \* \*